(12) United States Patent
Hsu

(10) Patent No.: US 8,773,429 B2
(45) Date of Patent: Jul. 8, 2014

(54) METHOD AND SYSTEM OF VIRTUAL TOUCH IN A STEROSCOPIC 3D SPACE

(75) Inventor: Chia-Jui Hsu, Taipei (TW)

(73) Assignee: Cyberlink Corp., Shindian, Taipei (TW)

( * ) Notice: Subject to any disclaimer, the term of this patent is extended or adjusted under 35 U.S.C. 154(b) by 297 days.

(21) Appl. No.: 13/296,316

(22) Filed: Nov. 15, 2011

(65) Prior Publication Data

US 2013/0120360 A1    May 16, 2013

(51) Int. Cl.
*G06T 15/00* (2011.01)
*G06F 3/01* (2006.01)
*H04N 13/00* (2006.01)
*H04N 13/04* (2006.01)

(52) U.S. Cl.
CPC ............ *G06F 3/011* (2013.01); *H04N 13/0022* (2013.01); *H04N 13/0033* (2013.01); *H04N 13/0011* (2013.01); *H04N 13/0468* (2013.01)
USPC .......................................... 345/419; 345/589

(58) Field of Classification Search
None
See application file for complete search history.

(56) References Cited

U.S. PATENT DOCUMENTS

| | | | |
|---|---|---|---|
| 6,512,892 B1 * | 1/2003 | Montgomery et al. | 396/326 |
| 2009/0322763 A1 * | 12/2009 | Bang et al. | 345/474 |
| 2012/0019528 A1 * | 1/2012 | Ugawa et al. | 345/419 |
| 2012/0050535 A1 * | 3/2012 | Densham et al. | 348/159 |
| 2012/0086631 A1 * | 4/2012 | Osman et al. | 345/156 |
| 2012/0105611 A1 * | 5/2012 | Godar | 348/54 |
| 2012/0120063 A1 * | 5/2012 | Ozaki | 345/419 |
| 2012/0229377 A1 * | 9/2012 | Kim et al. | 345/157 |
| 2012/0293513 A1 * | 11/2012 | Krishnaswamy | 345/423 |
| 2013/0127850 A1 * | 5/2013 | Bindon | 345/420 |

* cited by examiner

*Primary Examiner* — Ulka Chauhan
*Assistant Examiner* — Patrick F Valdez
(74) *Attorney, Agent, or Firm* — McClure, Qualey & Rodack, LLP

(57) ABSTRACT

Systems and methods are disclosed for adjusting parallax for a 3D object appearing on a display. One such method includes selecting a target 3D object, calculating an adjusted parallax position, calculating a z-axis offset based at least in part on the adjusted parallax position, adjusting a first z-axis position of the target 3D object by the z-axis offset, and rendering the target 3D object on the display at the adjusted first z-axis position. The adjusted parallax position is based at least in part on a maximum user reach, a comfortable viewing distance, and a distance between a user and the display. The z-axis offset is set to a difference between the adjusted parallax position and a parallax for a 3D object which is farthest from the user.

17 Claims, 12 Drawing Sheets

METHOD AND SYSTEM OF VIRTUAL TOUCH IN A STEROSCOPIC 3D SPACE

CROSS REFERENCE TO RELATED APPLICATIONS

Not applicable.

TECHNICAL FIELD

The present disclosure generally relates to stereoscopic three-dimensional (3D) graphics.

BACKGROUND

Stereoscopic 3D video systems generate left eye and right eye images, i.e., objects as viewed by the left and right eye respectively, which differ slightly because each eye is at a slightly different location and thus has a different optical axis. The apparent displacement of an object viewed along these two different lines of sight is known as "parallax." When each eye receives its appropriate image, the brain perceives differences in these images (parallax) as depth, the third dimension in "3D." Many conventional stereoscopic 3D displays incorporate a touch panel so that the user interacts with the system by touching what is displayed directly on the screen. However, conventional stereoscopic systems generate an uncomfortable amount of parallax when the user is close enough to touch the screen, which can lead to eyestrain. Also, the use of a touch panel increases the system cost.

SUMMARY

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure.

DETAILED DESCRIPTION

Figure 1:
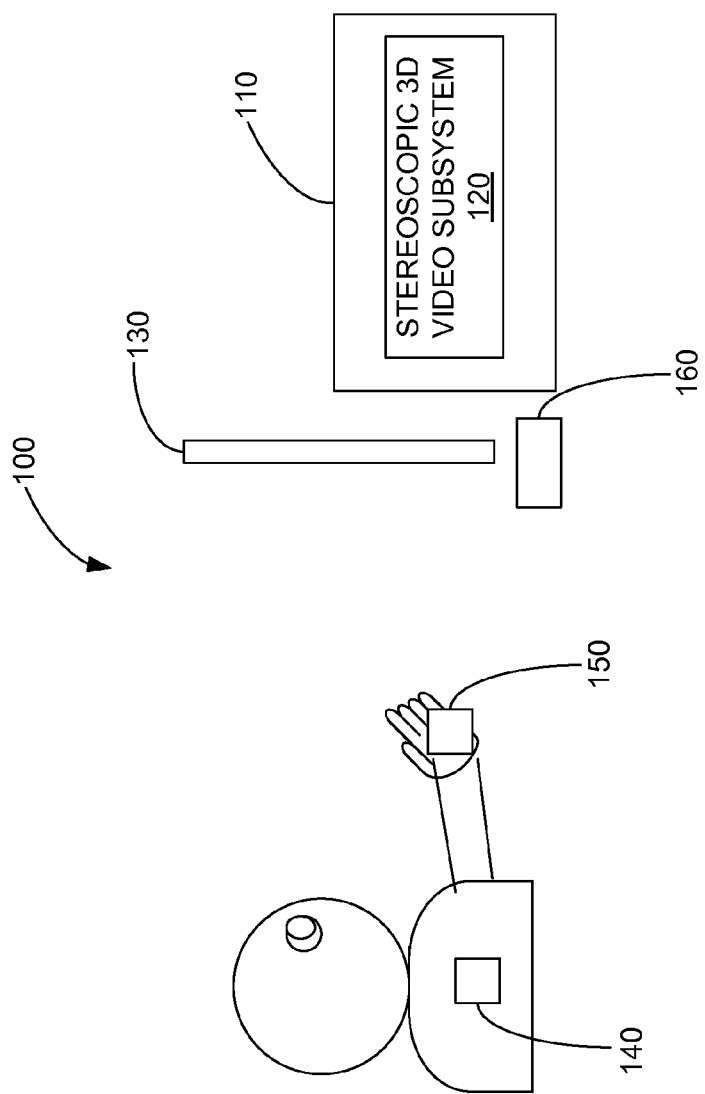
FIG. 1 is a block diagram of a virtual touch system, according to some embodiments disclosed herein.

Various embodiments of virtual touch systems and methods described herein allow a user to interact with touchable 3D objects (e.g., menus, icons, buttons, toolbars, user controls, etc.) through a virtual 3D cursor. As further described below, touchable objects are projected into viewer space by a stereoscopic 3D display, while body and hand location are tracked with sensors and used to position the virtual cursor in viewer space. In some embodiments, the stereoscopic depth of the touchable objects and/or the virtual cursor is adjusted as the user moves relative to the display, so as to maintain a comfortable amount of parallax. In some embodiments, the user's hand is synchronized with the virtual cursor.

Having summarized various aspects of the present disclosure, reference will now be made in detail to the description of the disclosure as illustrated in the drawings. While the disclosure will be described in connection with these drawings, there is no intent to limit it to the embodiment or embodiments disclosed herein. On the contrary, the intent is to cover all alternatives, modifications, and equivalents included within the spirit and scope of the disclosure as defined by the appended claims.

FIG. 1 is a block diagram of a virtual touch system. The system 100 includes a computing device 110 with stereoscopic 3D capabilities and parallax adjustment. In this regard, the computing device 110 includes a stereoscopic 3D video subsystem 120 with parallax adjustment logic and/or virtual cursor logic. The system 100 also includes a display 130, a body position sensor 140, an appendage position sensor 150, and a location receiver 160. The location receiver 160 is located in approximately the same location as the display 130. The body position sensor 140 detects the position of the user's body relative to the display 130, while the appendage position sensor 150 detects the position of the user's arm, hand, leg, etc. relative to the display 130. The location receiver 160 receives information from the sensors 140, 150 and uses this information to determine the location of the user's body and appendage (respectively) relative to the display 130.

The stereoscopic 3D video subsystem 120 generates stereoscopic images by generating left eye and right eye images, i.e., objects as viewed by the left and right eye respectively. These images differ slightly because each eye is at a slightly different location and thus has a different optical axis. The apparent displacement of an object viewed along these two different lines of sight is known as "parallax." When each eye receives its appropriate image, the brain perceives differences in these images (parallax) as depth. As described in further detail below, the stereoscopic 3D video subsystem 120 includes parallax adjustment so that objects near the user appear at a comfortable depth, as perceived by the user.

Stereoscopic 3D functionality may be partitioned in various ways among the video subsystem 120, the display 130, various components of computing device 110, and/or additional components such as eyewear worn by the user. The stereoscopic 3D video subsystem 120 can use various technologies to generate the stereoscopic images. In some embodiments (sometimes called "passive stereo"), the left and right eye images are provided to the display 130 at the same time. With passive stereo, the generated images are separated in some way, for example, by color or by polarization. The viewer wears lenses with a different filter for each eye (e.g., blue channel for right eye and red channel for right eye, vertical polarized for right eye and horizontal polarized for left eye). As noted before, when the brain receives different images at each eye at substantially the same time, the result is a perception of 3D. In other embodiments (sometimes called "active stereo"), the left and right eye images are provided to display 130 sequentially (at a relatively high frequency such as 120 Hz), and the viewer wears shutter glasses which block the left and right eye synchronously with the display.

Figure 2:
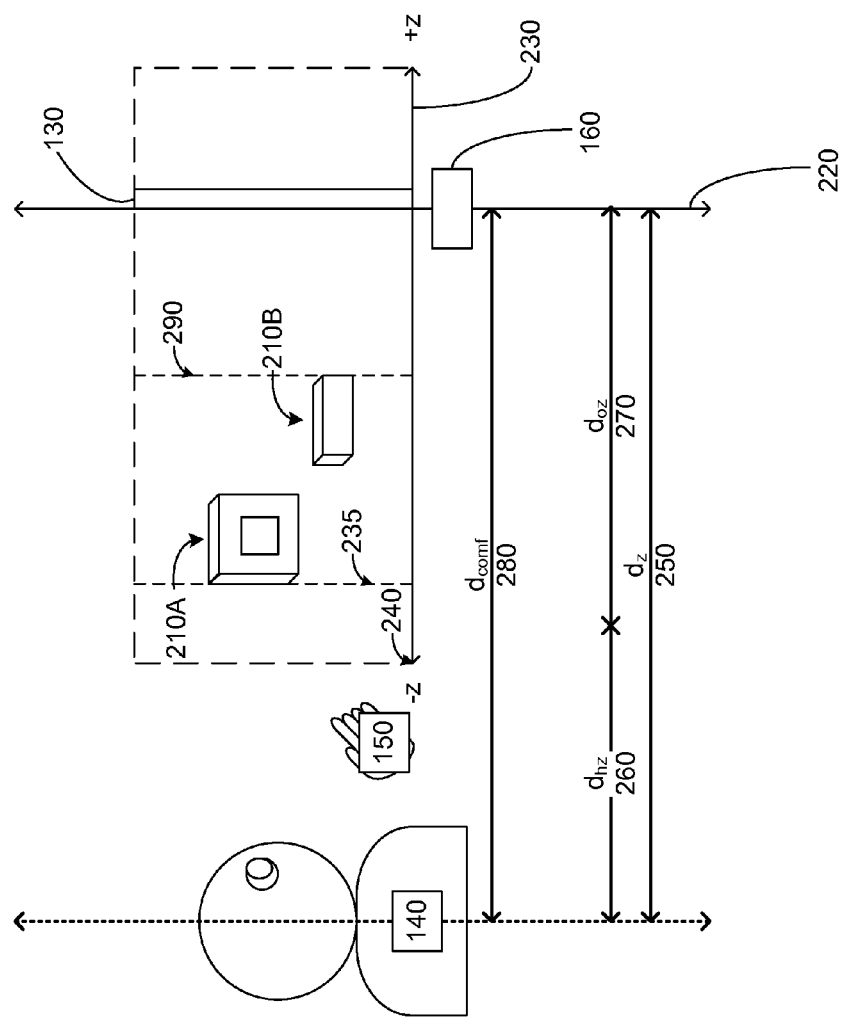
FIG. 2 is a diagram showing various spatial relationships in the virtual touch system from FIG. 1, according to some embodiments disclosed herein.

FIG. 2 is a diagram showing various spatial relationships in the virtual touch system from FIG. 1, according to some embodiments. The stereoscopic 3D video subsystem 120 (shown in FIG. 1) uses one or more of these spatial relationships to perform parallax adjustment for one or more objects 210A, 210B displayed by the stereoscopic 3D video subsystem 120. For purposes of this discussion, these objects are described with reference to a y-axis 220 and a z-axis 230. One or more objects 210A, 210B have an original parallax position $p_{oz}$ 235. Stereoscopic depth of an object is measured along the z-axis 230. The negative z-axis denotes positions that the user perceives as in front of the screen (i.e., viewer space) and as having negative parallax. The positive z-axis denotes positions that the user perceives as behind the screen (i.e., display space) and as having positive parallax. Although an axis is usually considered infinite in a strictly mathematical sense, when performing parallax adjustment the video subsystem 120 considers the negative z-axis to have a minimum parallax value, which is denoted as $p_{min}$ 240.

Using the body position sensor 140 and the location receiver 160, the stereoscopic 3D video subsystem 120 determines a distance $d_z$ 250 between the user and the display 130. The maximum user reach, or distance which the user's hand may extend from the body (i.e., the length of the user's arm), is denoted by the variable $d_{hz}$ 260. The distance between the display 130 and a maximum user reach with respect to the user's current position, i.e., $d_z-d_{hz}$, is denoted by the variable $d_{oz}$ 270. The maximum distance from the display 130 that provides a comfortable amount of parallax, referred to herein as the comfortable viewing distance, is denoted by the variable $d_{comf}$ 280. The range between zero and $d_{comf}$ on the viewer space is referred to herein as the comfortable viewing area.

While $d_z$ is obtained and updated using sensors, and $d_{oz}$ is computed relative to $d_z$, variables $d_{hz}$ and $d_{comf}$ are predetermined or preset in some manner. For example, $d_{hz}$ and $d_{comf}$ may be a fixed value, may be directly configurable by a user, may be part of a system configuration that is set up by an administrator, or may be predetermined in any other suitable manner. In some embodiments, the default values for $d_{hz}$ and $d_{comf}$ are based on the size of the display 130. The configuration process which sets values for $d_{hz}$ and $d_{comf}$ may involve sensors, but once these values are determined by the configuration process, they are not typically updated outside of the configuration process.

Figure 3:
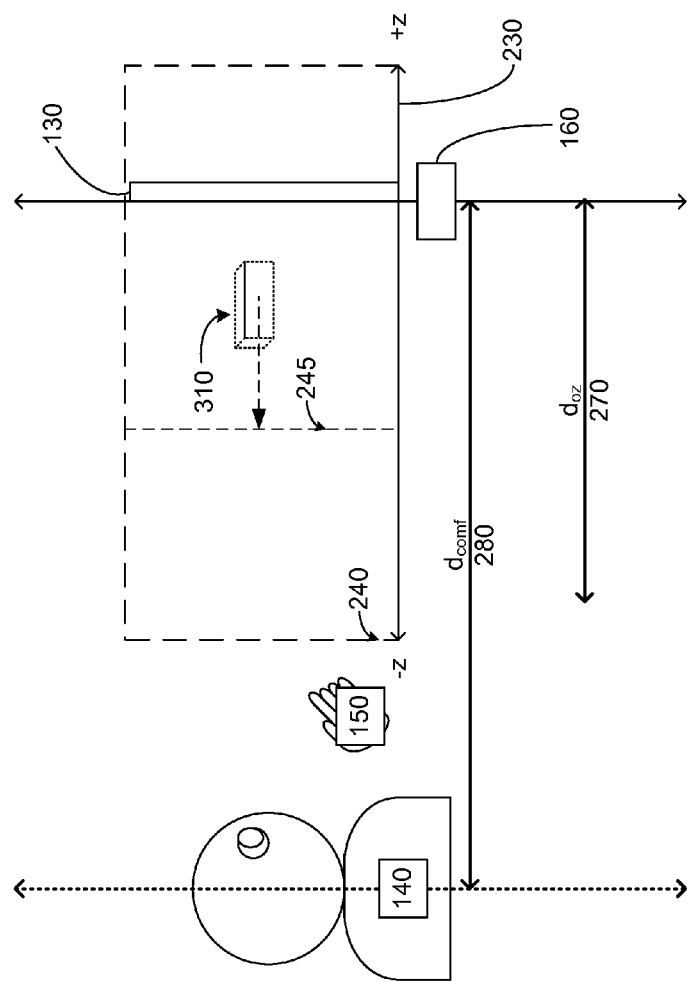
FIG. 3 is a diagram showing how the stereoscopic 3D video subsystem of FIG. 1 uses one or more of the spatial relationships from FIG. 2, according to some embodiments disclosed herein.

FIG. 3 is a diagram showing how the stereoscopic 3D video subsystem 120 uses one or more of the spatial relationships from FIG. 2 to perform parallax adjustment, according to some embodiments. The stereoscopic 3D video subsystem 120 generates, for display, one or more selectable objects 310 (for example, menu items, icons, etc.). In some embodiments, the objects 310 are selectable, for example, by a virtual cursor (shown in FIGS. 6A-6B). A selectable object 310 is displayed in 2-D space on the display 130 as separate left-eye and right-eye stereoscopic images, but is perceived by the user as appearing in 3-D space because of the stereoscopic effect known as parallax, described earlier in connection with FIG. 1.

The parallax adjustment described herein repositions a selectable object 310 along the z-axis 230 in an amount that insures a comfortable amount of parallax regardless of the user's position relative to the display 130. As explained in further detail below, the calculations for this parallax position $p_{oz'}$ 245 use $d_{oz}$ 270, $d_{comf}$ 280, and/or $p_{min}$ 240. The final z-axis position for the selectable object 310 depends on both the calculated parallax position $p_{oz'}$ 245 and the parallax for the 3D object which is farthest from the user $p_{ozmax}$ 290. These two parallax values are used to calculate a z-axis adjustment, or offset. The offset is obtained by computing the difference between the calculated parallax position $p_{oz'}$ 245 and the parallax for the 3D object which is farthest from the user $p_{ozmax}$ 290. The z-axis position of selectable object 310 is then adjusted by this calculated offset. The stereoscopic 3D video subsystem 120 then renders the objects 210A, 210B on the display 130 at the adjusted z-axis position, referred to herein as the parallax position $p_{oz'}$ 245. The object 310 is rendered in 3D space by perspective projecting the object 310 into 2D-space, which produces left-eye and right-eye stereoscopic images as described earlier in connection with FIG. 1. In some embodiments, the object 310 is generated directly by the video subsystem 120 at the direction of other components of the computing device 110, for example, a windowing system or a graphics driver running on a host processor. In other embodiments, generation of the object 310 is a function shared by the stereoscopic 3D video subsystem 120 and other components of the computing device 110.

As a result of this adjustment, the parallax experienced by the user in viewing the object 310 is maintained at a comfortable level. Without such an adjustment, the selectable objects 310 would seem too close to the viewer, which might lead to eyestrain.

Figure 4:
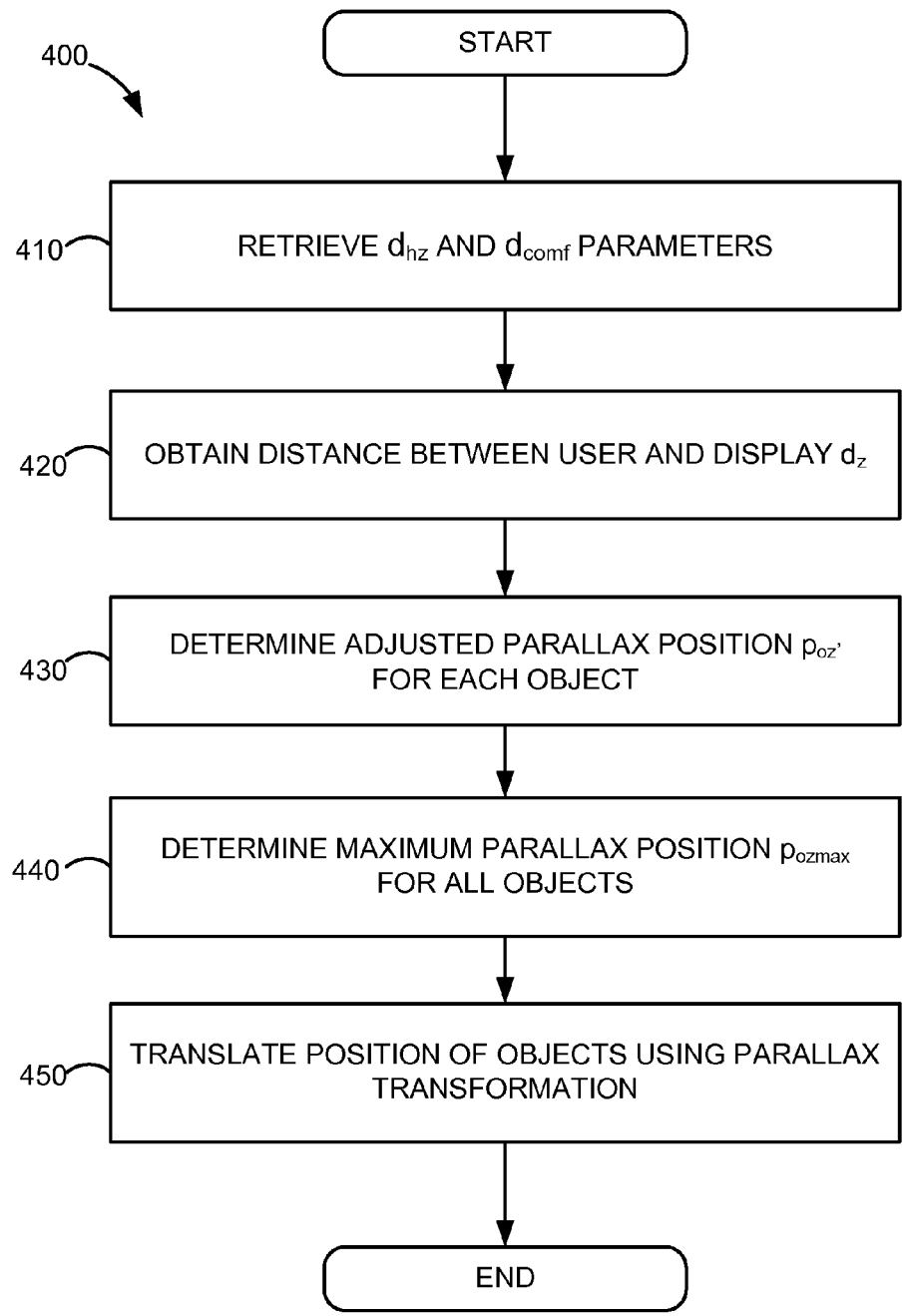
FIG. 4 is a flow chart describing a representative method for implementing parallax adjustment, according to some embodiments disclosed herein.

FIG. 4 is a flow chart describing a representative method for implementing parallax adjustment of a set of touchable objects 210A, 2108 (FIG. 2), as performed by some embodiments of the stereoscopic 3D video subsystem 120. The method 400 begins at block 410, where values are obtained for maximum user reach $d_{hz}$ 260 (FIG. 2) and comfortable viewing distance $d_{comf}$ (FIG. 2). Next, at block 420, the user-to-display distance $d_z$ 250 (FIG. 2) is obtained, using the location information provided by the body position sensor 140 and the location receiver 160 (FIG. 1). The method continues at block 430, where a parallax position $p_{oz'}$ 245 (FIGS. 5 and 6) is calculated for each object (210A, 210B, 310, 610A, 610B) that is considered movable. This parallax position is the maximum parallax bound of all adjusted touchable objects (210A, 210B, 310, 610A, 610B). As will be described in more detail below, this parallax position $p_{oz'}$ 245 is based on $d_{oz}$ 270 (FIG. 2) $d_{comf}$ 280 (FIG. 2) and $p_{min}$ 240 (FIG. 2), and varies according the user's body and hand position relative to the display 130. Next, at block 440, the maximum parallax position $p_{ozmax}$ across all objects in the set of movable objects is determined, by looking for the object 210A, 210B having the largest $p_{oz}$ (i.e., the object that is farthest from the user). Finally, at block 450, the parallax of each object movable object (210A, 210B, 310, 610A, 610B) is adjusted by a translating function which projects the determined maximum parallax position $p_{ozmax}$ to the parallax position $p_{oz'}$ 245. The flow chart of FIG. 4 can be applied to adjust the z-position of any number of objects. The set of objects to which the adjustment applies can be determined by the user (e.g., by selection) or can be a predefined set (e.g., all objects of a specific type).

Figure 5A:
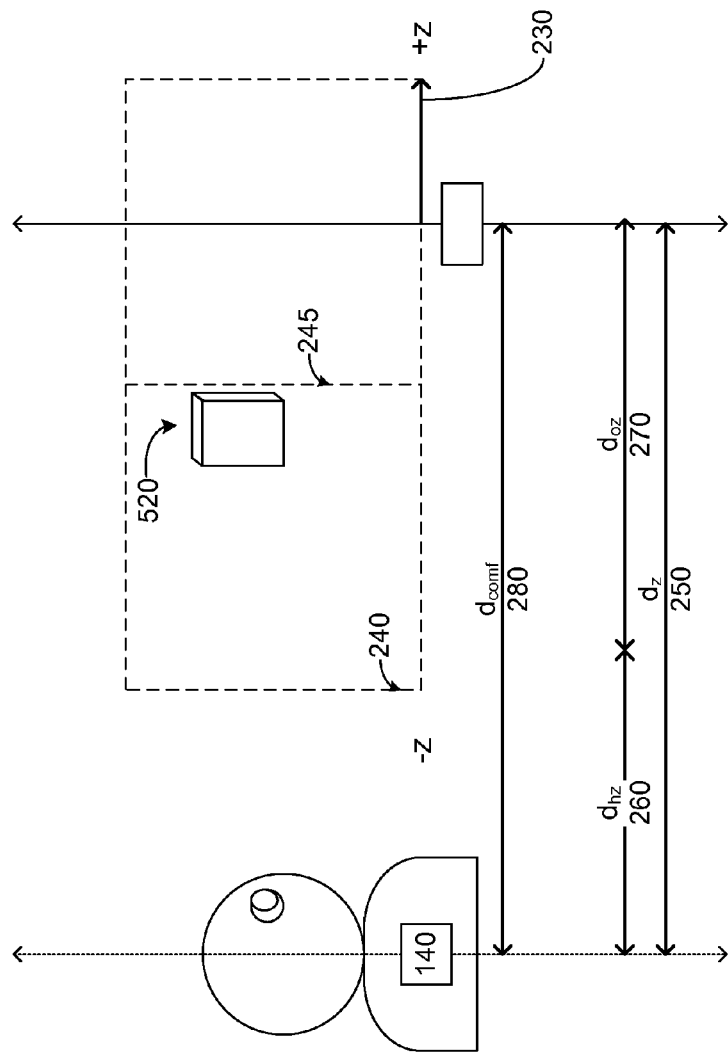
FIGS. 5A-5C illustrate how a parallax position is calculated according to the positioning of the user's body and hand, according to some embodiments disclosed herein.
Figure 5B:
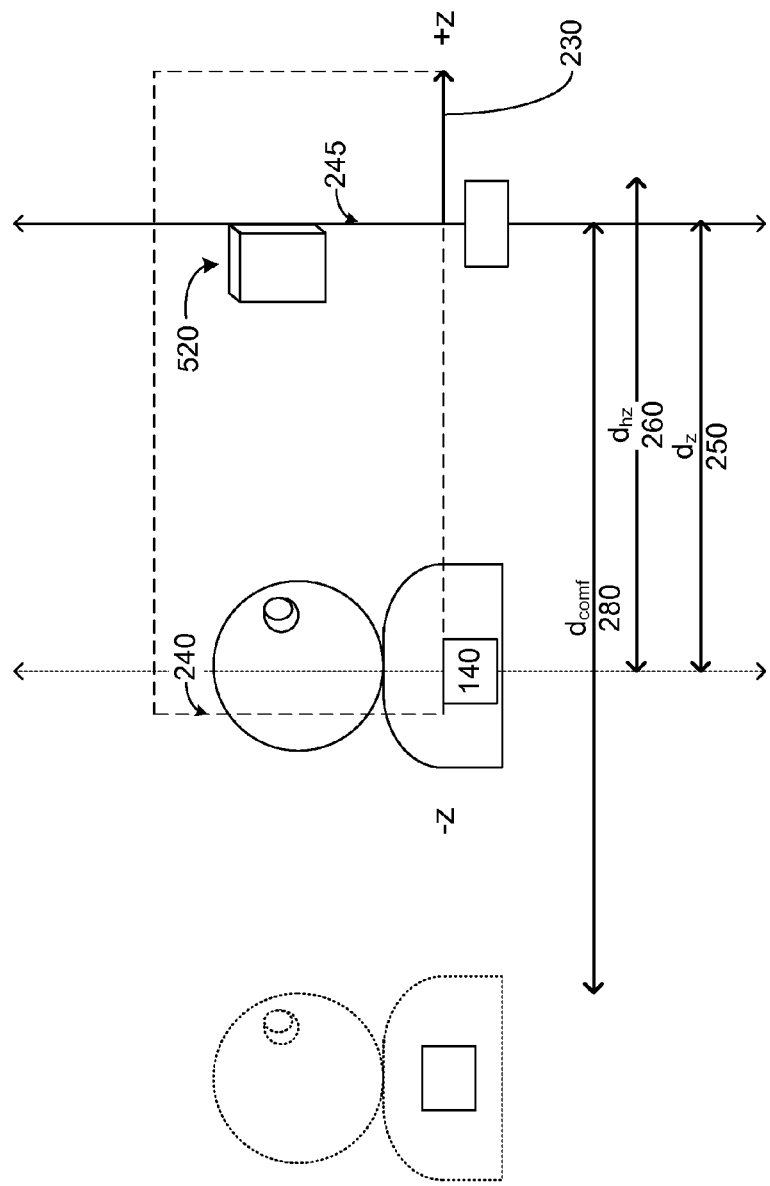
Figure 5C:
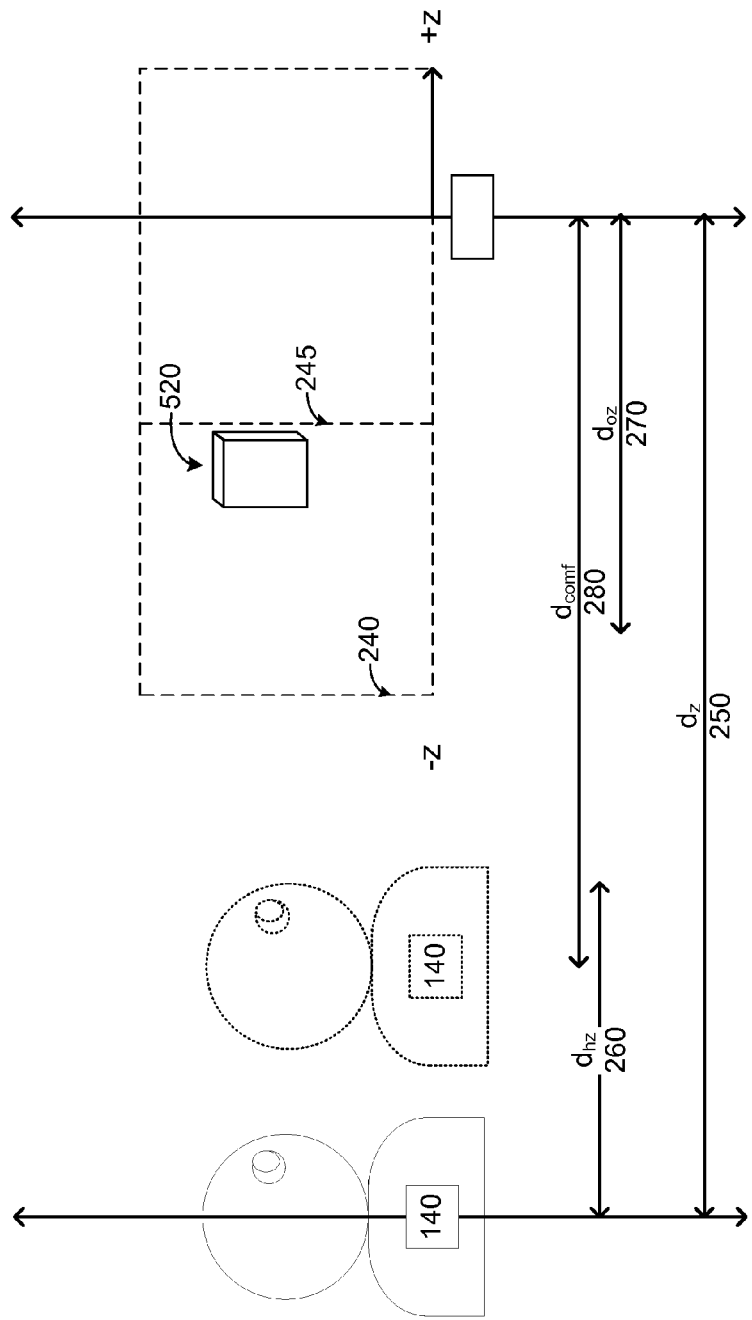

FIGS. 5A-5C illustrate how the parallax position $p_{oz'}$ 245 is calculated according to the positioning of the user's body and hand relative to the display 130. In the positioning scenario shown in FIG. 5A, the user's body is at or inside of the comfortable viewing area $d_z$ 260<$d_{comf}$ 280 on z-axis 230) and the user's maximum reach does not extend to the display 130 (i.e., $d_{hz}$ 260<$d_z$ 250). As noted earlier, the distance between the display 130 and the maximum reach $d_{hz}$ 260 is denoted as $d_{oz}$ 270, and the minimum value of the negative z-axis is denoted as $p_{min}$ 240. Under these conditions, the parallax adjustment method 400 operates as follows. The method 400 calculates $d_{oz}$ 270 as $d_z$ 250−$d_{hz}$ 260. The method 400 maps $d_{comf}$ 280 to $p_{min}$ 240 in the stereoscopic 3D space. The method 400 calculates the parallax position $p_{oz'}$ 245 for selectable object 520 by scaling the distance between the display 130 and the maximum user reach $d_{hz}$ 260 by $d_{comf}$ 280 as mapped to $p_{min}$ 240:

$$p_{oz'} = d_{oz}/d_{comf} * p_{min} \quad \text{(Eq. 1)}.$$

FIG. 5B illustrates how the parallax position $p_{oz'}$ 245 for selectable object 520 is calculated when the user's body is inside the comfortable viewing area far enough to touch the screen at maximum reach (i.e., $d_z$ 250<$d_{comf}$ 280 and $d_{hz}$ 260>=$d_z$ 250). Under these conditions, the parallax adjustment method 400 sets the parallax position $p_{oz'}$ 245 to zero:

$$p_{oz'} = 0 \quad \text{(Eq. 2)}.$$

FIG. 5C illustrates how the parallax position $p_{oz'}$ 245 is calculated when the user's body is outside the comfortable viewing area. Outside of the comfortable viewing area, the parallax adjustment method 400 uses $d_{comf}$ 280 in determining the distance 270 between the viewer's maximum reach and the display 130:

$$d_{oz} = d_{comf} - d_{hz} \quad \text{(Eq. 3)}.$$

The parallax adjustment method 400 calculates the parallax position $p_{oz'}$ 245 by scaling $d_{oz}$ 260 by $d_{comf}$ 280 as mapped to $p_{min}$ 240:

$$p_{oz'} = d_{oz}/d_{comf} * p_{min} \quad \text{(Eq. 4)}.$$

As a result of the change in calculating $d_{oz}$ 270, as the viewer moves further outside the comfortable viewing area the parallax position $p_{oz'}$ 245 decreases (i.e., moves left along the z-axis) and then stops at a minimum value.

Figure 6A:
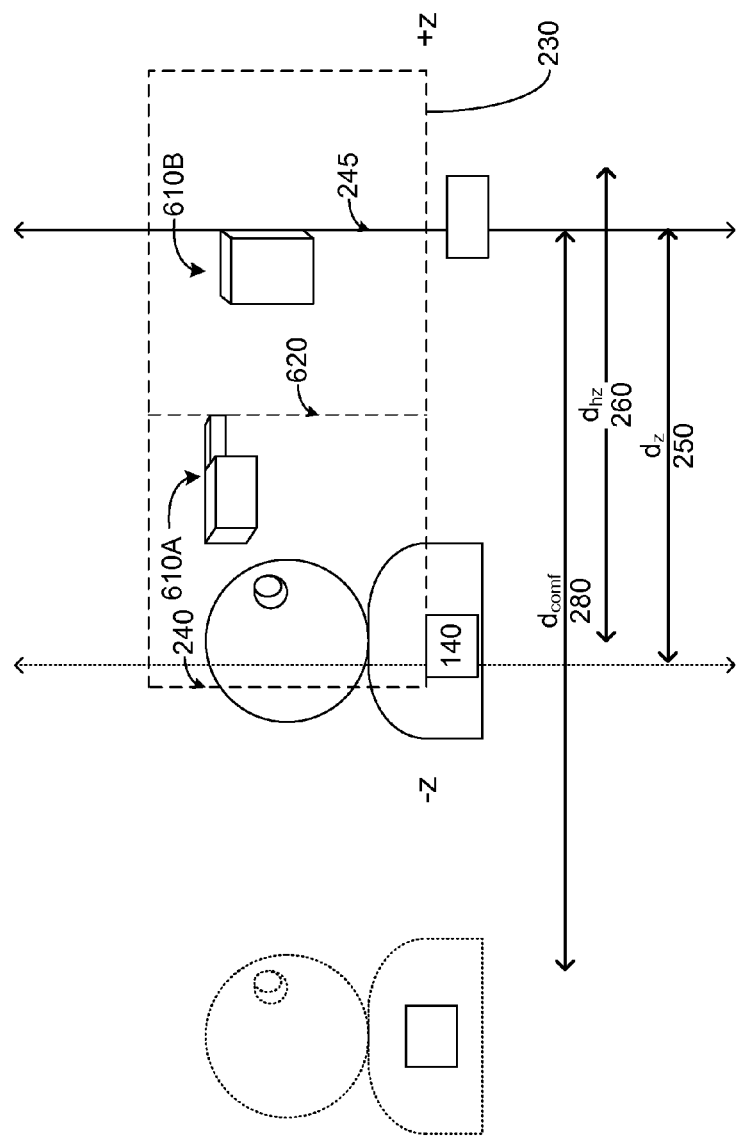
FIGS. 6A-6B illustrate how the stereoscopic 3D video subsystem of FIG. 1 performs parallax adjustment of a virtual cursor, according to some embodiments disclosed herein.
Figure 6B:
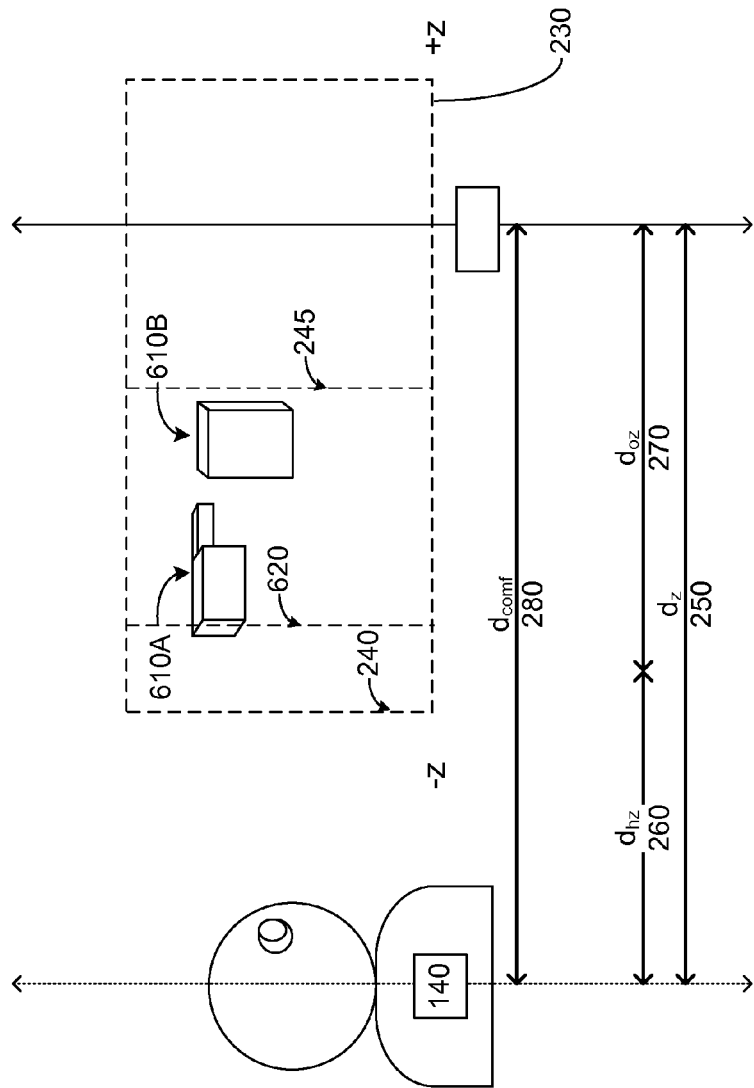

FIGS. 6A-6B illustrate how stereoscopic 3D video subsystem 120 performs parallax adjustment of a virtual cursor 610A, according to some embodiments. FIG. 6A illustrates how a parallax cursor difference $P_{hz'}$ 620 is calculated when the user is close enough to touch the display 130 (i.e., $d_{hz}$ 260>=$d_z$ 250). Under these conditions, the parallax cursor difference $p_{hz'}$ 620 is calculated by scaling the distance from the user to the display as follows:

$$p_{hz'} = d_z/d_{comf} * p_{min} \quad \text{(Eq. 5)}.$$

Depending on the value of the variables, the virtual cursor 610A may or may not be shown to the user. Parallax position $p_{oz'}$ 245 is set to zero, as explained above in connection with FIG. 5B. Parallax for selectable object 610B is calculated as explained above in connection with FIGS. 5A-5C.

FIG. 6B illustrates how parallax cursor difference $p_{hz'}$ 620 is calculated differently when the user's body is not close enough to touch the display 130 (i.e., $d_{hz}$ 260<$d_z$ 250). Under these conditions, parallax cursor difference $p_{hz'}$ 620 is calculated by scaling the maximum reach as follows:

$$p_{hz'} = d_{hz}/d_{comf} * p_{min} \quad \text{(Eq. 6)}.$$

Thus, when the user is not close enough to touch the display 130, the virtual cursor 310 will be visible to the user. The stereoscopic depth of 3D virtual cursor is also adjusted according to the user's movement in front of the touchable 3D objects. The parallax position $p_{oz'}$ 245 for selectable objects is calculated by scaling the distance between the display 130 and the maximum user reach $d_{hz}$ 260 by $d_{comf}$ 280, as mapped to $p_{min}$ 240, as explained above in connection with FIG. 5A. Parallax for selectable object 610B is calculated as explained above in connection with FIGS. 5A-5C.

Figure 7:
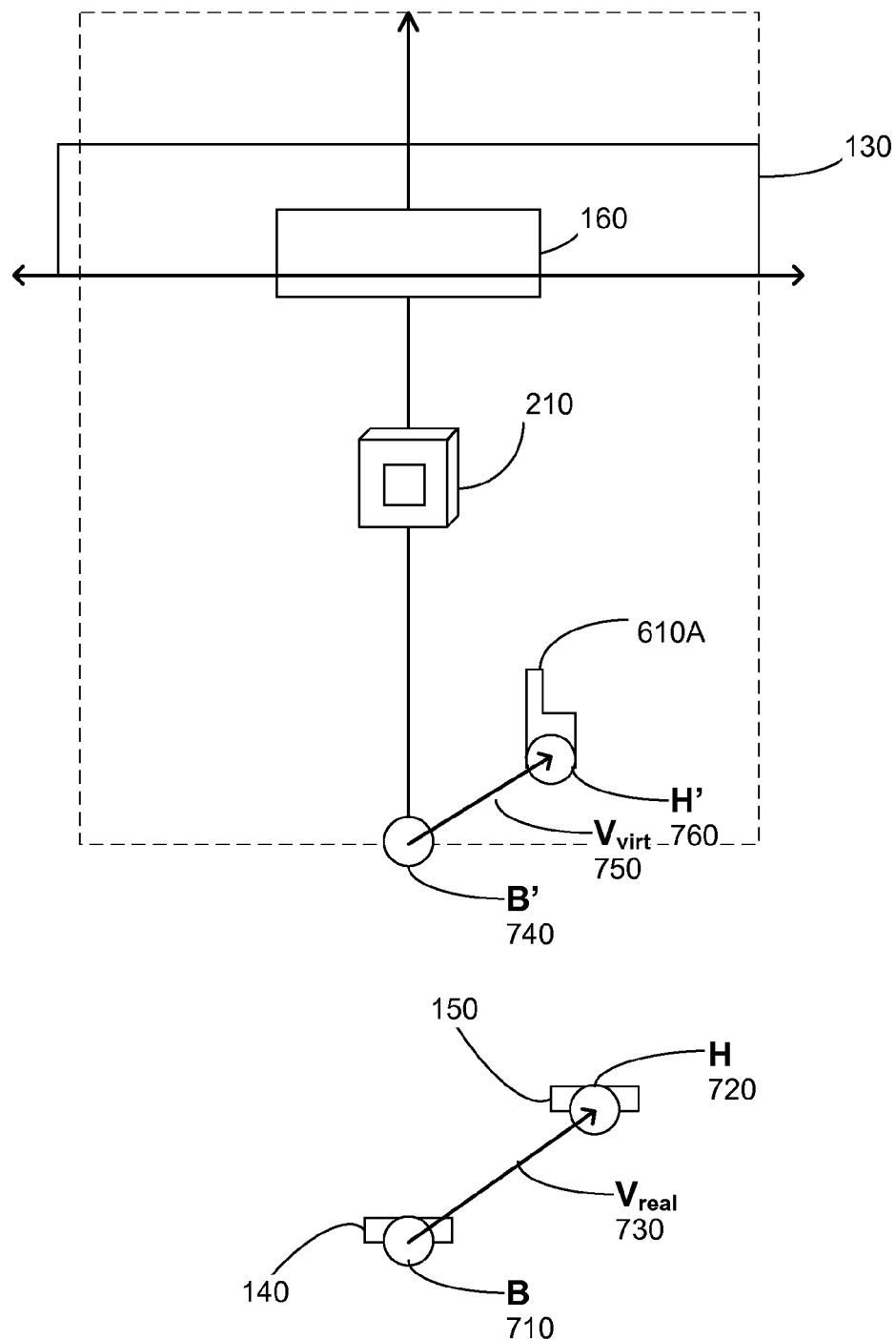
FIG. 7 is a diagram showing how the stereoscopic 3D video subsystem of FIG. 1 uses one or more of the spatial relationships from FIG. 2, according to some embodiments disclosed herein.

FIG. 7 is a diagram showing how the stereoscopic 3D video subsystem 120 uses one or more of the spatial relationships from FIGS. 6A and 6B to perform synchronization of the hand with virtual cursor 610A, according to some embodiments. Using body position sensor 140, hand position sensor 150, and location receiver 160, stereoscopic 3D video subsystem 120 (FIG. 1) determines the body position B 710 and the hand position H 720 in real space. The vector $v_{real}$ 730, corresponding to the body-hand vector in real space, is computed as a vector of B 710 and H 720. Having determined positions in real space, stereoscopic 3D video subsystem 120 calculates the body and hand positions in the stereoscopic cue (i.e., virtual space) by mapping from B 710 and H 720 as follows.

Stereoscopic 3D video subsystem 120 computes a scaling factor s as the absolute value of the ratio of parallax cursor difference to maximum reach: $s=|p_{hz'}|/d_{hz'}$. Using scaling factor s, stereoscopic 3D video subsystem 120 calculates the body position B' 740 in virtual space as follows. The x value of B' 740 is computed as $s*v_{real}(x)+B(x)$. The y value of B' 740 is computed as $s*v_{real}(y)+B(y)$. The z value of B' 740 is computed as $p_{hz'}+p_{oz'}$. Stereoscopic 3D video subsystem 120 sets the vector $v_{virt}$ 750, corresponding to the body-hand vector in virtual space, to $s*v_{real}$ 730. Stereoscopic 3D video subsystem 120 derives the hand position H' 760 in virtual space by mapping from B' 740 and $v_{virt}$ 750. Since the virtual cursor 610A represents the hand in virtual space, stereoscopic 3D video subsystem 120 transforms virtual cursor 610A to hand position H' 760 and displays virtual cursor 610A. This display involves generating separate left-eye and right-eye stereoscopic images for virtual cursor 610A.

Figure 8:
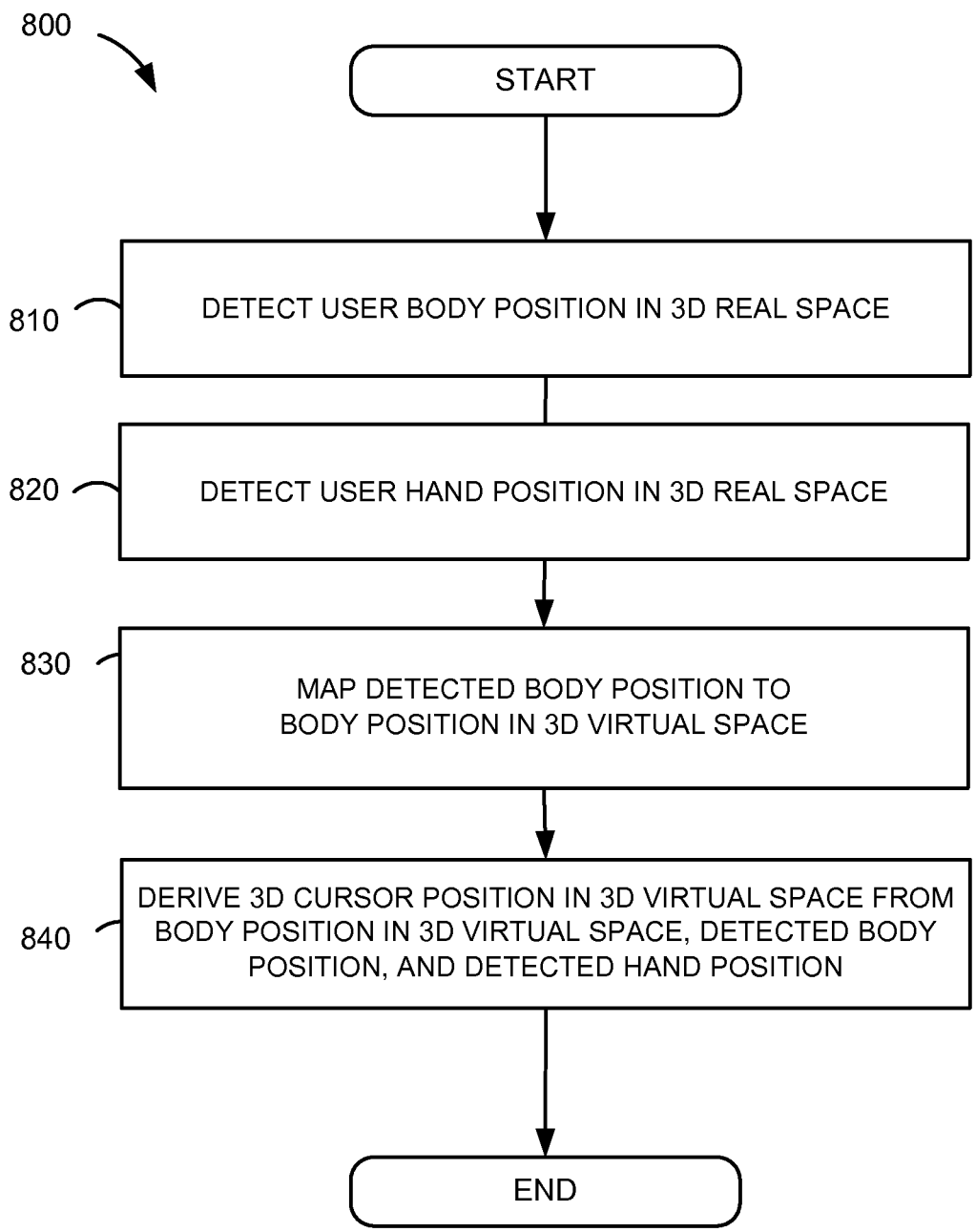
FIG. 8 is a flow chart describing a representative method for implementing virtual 3D cursor synchronization, according to some embodiments disclosed herein.

FIG. 8 is a flow chart describing a representative method for implementing virtual 3D cursor synchronization, as performed by some embodiments of stereoscopic 3D video subsystem 120. The method 800 begins at block 810, where a body position of the user in 3D real space is detected. The method continues at block 820, where a hand position of the user in 3D real space is detected. At block 830, the detected body position is mapped to a body position in 3D virtual space. In some embodiments, the mapping includes applying a scaling factor to the detected body position to produce the body position in 3D virtual space. At block 840, a position of the 3D cursor in 3D virtual space is derived. This derivation is based at least in part on the body position in 3D virtual space, the detected body position, and the detected hand position.

In some embodiments which use the scaling factor, the method also computes a real space vector and applies a scaling factor to the real space vector. The real space vector is a vector including the detected body position and the detected hand position, and thus represents a relationship between these two positions. The application of the scaling factor to the real space vector produces a virtual space vector. The virtual space vector includes the body position in 3D virtual space and a hand position in 3D virtual space, and thus represents a relationship between these two positions. In some embodiments, the deriving performed in block 840 is further based on the virtual space vector. In some embodiments, the deriving performed in block 840 derives the position of the 3D virtual cursor in virtual space based at least in part on the body position in 3D virtual space and the virtual space vector.

Figure 9:
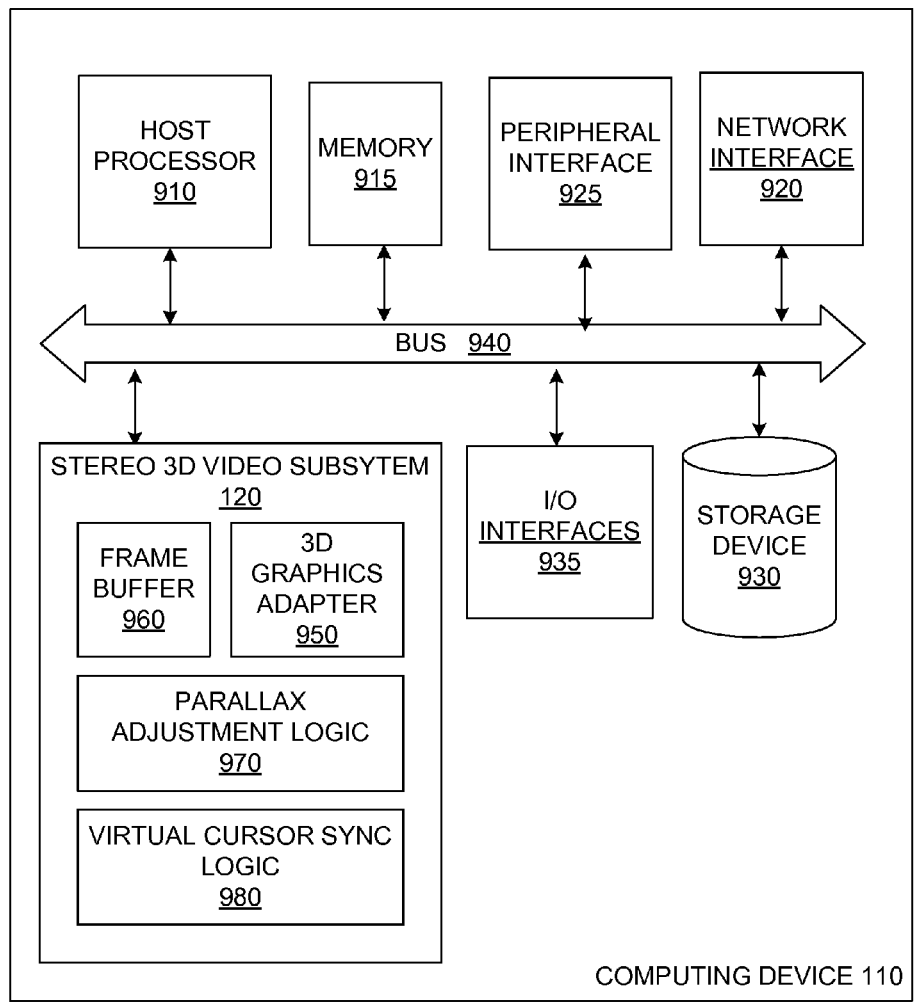
FIG. 9 is a high-level block diagram of the computing device of FIG. 1, according to some embodiments disclosed herein.

FIG. 9 is a high-level block diagram of computing device 110, according to some embodiments disclosed herein. Computing device 110 includes a host processor 910, memory 915, stereoscopic 3D video subsystem 120, a network interface 920, a peripheral interface 925, a storage device 930 (e.g., non-volatile memory or a disk drive), and one or more input output (I/O) interfaces 935. These hardware components are coupled via a bus 940. Omitted from FIG. 9 are a number of components that are unnecessary to explain the operation of computing device 110.

Stereoscopic 3D video subsystem 120 includes a 3D graphics adapter 950 and a frame buffer 960. Stereoscopic 3D video subsystem 120 also includes parallax adjustment logic 970 and/or virtual 3D cursor logic 980. Parallax adjustment logic 970 implements the functions described in connection with FIGS. 1, 2, 3, 4, and 5A-C. Virtual 3D cursor logic 980 implements the functions described in connection with FIGS. 6A-B, 7, and 8.

Logic 980 and logic 970 can be implemented in software (i.e., instructions executing on a processor), and in such an implementation, these components are execute from memory 915. These components can also be implemented in specialized hardware logic. Hardware implementations include (but are not limited to) a programmable logic device (PLD), programmable gate array (PGA), field programmable gate array (FPGA), an application-specific integrated circuit (ASIC), a system on chip (SoC), and a system in package (SiP). Persons of ordinary skill should also appreciate that these components may be implemented using any combination of hardware and software. In some embodiments of computing device 110, the software components are stored on a computer-readable medium, which in the context of this disclosure refers to any structure which can contain, store, or embody instructions executable by a processor. The computer readable medium can be, for example but not limited to, based on electronic, magnetic, optical, electromagnetic, infrared, or semiconductor technology. Specific examples of a computer-readable medium using electronic technology would include (but are not limited to) the following: a random access memory (RAM); a read-only memory (ROM); and an erasable programmable read-only memory (EPROM or Flash memory). A specific example using magnetic technology includes (but is not limited to) a disk drive; and a portable computer diskette. Specific examples using optical technology include (but are not limited to) a compact disk read-only memory (CD-ROM) or a digital video disk read-only memory (DVD-ROM).

Any process descriptions or blocks in flowcharts would be understood as representing modules, segments, or portions of code which include one or more executable instructions for implementing specific functions or steps in the process. As would be understood by those of ordinary skill in the art of the software development, alternate implementations are also included within the scope of the disclosure. In these alternate implementations, functions may be executed out of order from that shown or discussed, including substantially concurrently or in reverse order, depending on the functionality involved.

The foregoing description has been presented for purposes of illustration and description. It is not intended to be exhaustive or to limit the disclosure to the precise forms disclosed. Obvious modifications or variations are possible in light of the above teachings. The implementations discussed, however, were chosen and described to illustrate the principles of the disclosure and its practical application to thereby enable one of ordinary skill in the art to utilize the disclosure in various implementations and with various modifications as are suited to the particular use contemplated. All such modifications and variation are within the scope of the disclosure as determined by the appended claims when interpreted in accordance with the breadth to which they are fairly and legally entitled.

At least the following is claimed:

1. A method of adjusting parallax for a 3D object appearing on a display, the method comprising:
    selecting a target 3D object;
    calculating an adjusted parallax position, based at least in part on a maximum user reach, a comfortable viewing distance, and a distance between a user and the display;
    calculating a z-axis offset based at least in part on the adjusted parallax position, wherein the z-axis offset is set to a difference between the adjusted parallax position and a parallax for a 3D object which is farthest from the user;
    adjusting a first z-axis position of the target 3D object by the z-axis offset;
    rendering the target 3D object on the display at the adjusted first z-axis position; and
    calculating a parallax cursor difference to be the maximum user reach scaled by a ratio of the comfortable viewing distance and the minimum parallax value of the negative z-axis, if the maximum user reach is less than the distance between the user and the display.

2. The method of claim 1, further comprising:
    adjusting a second z-axis position of another 3D object by the z-axis offset, the another 3D object being other than the target 3D object; and
    rendering the another 3D object on the display at the adjusted second z-axis position.

3. The method of claim 2, wherein the at least one other 3D object is user selectable.

4. The method of claim 2, wherein the at least one other 3D object is a predefined object.

5. The method of claim 1, wherein the calculating the adjusted parallax position step sets the adjusted parallax position to zero if the maximum user reach is greater than the distance between the user and the display.

6. The method of claim 1, wherein the calculating the adjusted parallax position step bases the adjusted parallax position at least in part on a difference between the maximum user reach and the distance between the user and the display, if the maximum user reach is less than the distance between the user and the display.

7. The method of claim 1, wherein the calculating the adjusted parallax position step bases the adjusted parallax position at least in part on a difference between the comfortable viewing distance and the maximum user reach, if the comfortable viewing distance is not less than the distance between the user and the display.

8. The method of claim 1, wherein the maximum user reach distance and the comfortable viewing distance are predetermined.

9. The method of claim 1, further comprising:
    calculating the distance between the user and the display by sensing a location of the user and a location of the display.

10. A method of adjusting parallax for a 3D object appearing on a display, the method comprising:
    selecting a target 3D object;

calculating an adjusted parallax position, based at least in part on a maximum user reach, a comfortable viewing distance, and a distance between a user and the display;

calculating a z-axis offset based at least in part on the adjusted parallax position, wherein the z-axis offset is set to a difference between the adjusted parallax position and a parallax for a 3D object which is farthest from the user;

adjusting a first z-axis position of the target 3D object by the z-axis offset;

rendering the target 3D object on the display at the adjusted first z-axis position; and calculating a parallax cursor difference to be the distance between the user and the display scaled by a ratio of the comfortable viewing distance and the minimum parallax value of the negative z-axis, if the maximum user reach is not less than the distance between the user and the display.

11. A computing device for adjusting parallax for a 3D object appearing on a display at a particular z-axis position, the device comprising:

memory; and a processor configured by instructions retrieved from the memory to:

select a target 3D object;

calculate an adjusted parallax position, based at least in part on a maximum user reach, a comfortable viewing distance, and a distance between a user and the display;

calculate a z-axis offset based at least in part on the adjusted parallax position, wherein the z-axis offset is set to a difference between the adjusted parallax position and a parallax for a 3D object which is farthest from the user;

adjust a first z-axis position of the 3D object by the z-axis offset;

render the target 3D object on the display at the adjusted first z-axis position; and calculating a parallax cursor difference to be the maximum user reach scaled by a ratio of the comfortable viewing distance and the minimum parallax value of the negative z-axis, if the maximum user reach is less than the distance between the user and the display.

12. The computing device of claim 11, wherein the processor is further configured by the instructions to set the adjusted parallax position to zero if the maximum user reach is greater than the distance between the user and the display.

13. The computing device of claim 11, wherein the processor is further configured by the instructions to set the adjusted parallax position to a difference between the maximum user reach and the distance between the user and the display, if the maximum user reach is less than the distance between the user and the display.

14. The computing device of claim 11, wherein the processor is further configured by the instructions to set the adjusted parallax position to a difference between the comfortable viewing distance and the maximum user reach, if the comfortable viewing distance is not less than the distance between the user and the display.

15. The computing device of claim 11, wherein the processor is a host processor of the computing device.

16. The computing device of claim 11, wherein the processor is a graphics processor of the computing device.

17. A computing device for adjusting parallax for a 3D object appearing on a display at a particular z-axis position, the device comprising:

memory; and a processor configured by instructions retrieved from the memory to:

select a target 3D object;

calculate an adjusted parallax position, based at least in part on a maximum user reach, a comfortable viewing distance, and a distance between a user and the display;

calculate a z-axis offset based at least in part on the adjusted parallax position, wherein the z-axis offset is set to a difference between the adjusted parallax position and a parallax for a 3D object which is farthest from the user;

adjust a first z-axis position of the 3D object by the z-axis offset;

render the target 3D object on the display at the adjusted first z-axis position; and calculating a parallax cursor difference to be the distance between the user and the display scaled by a ratio of the comfortable viewing distance and the minimum parallax value of the negative z-axis, if the maximum user reach is not less than the distance between the user and the display.

* * * * *